July 23, 1957  P. W. MALLOY  2,800,311
APPARATUS FOR WHIPPING CREAM AND THE LIKE
Filed Dec. 29, 1954  2 Sheets-Sheet 2
Fig. 4.
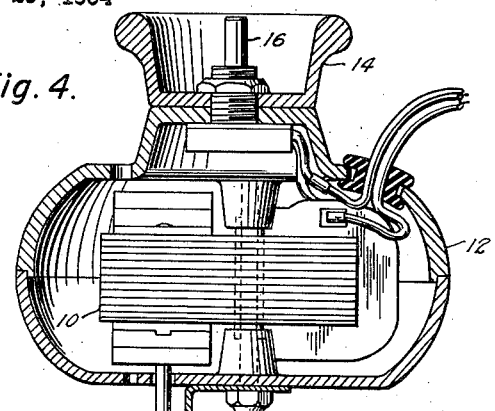
Fig. 12.
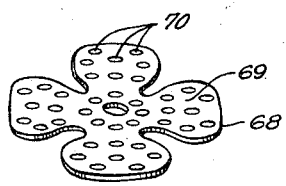
Fig. 5.
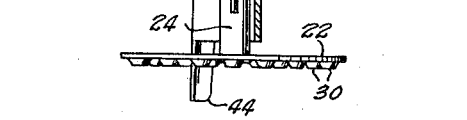
Fig. 13.
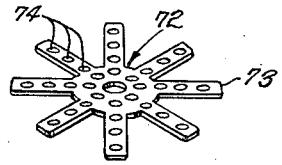
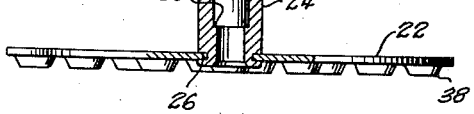
Fig. 6.
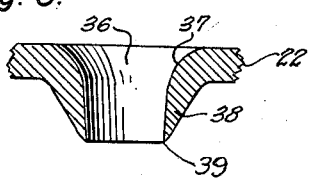
*Percy W. Malloy*
INVENTOR.
BY *Jones, Tesch & Darbo*
ATTORNEY United States Patent Office 2,800,311
Patented July 23, 1957

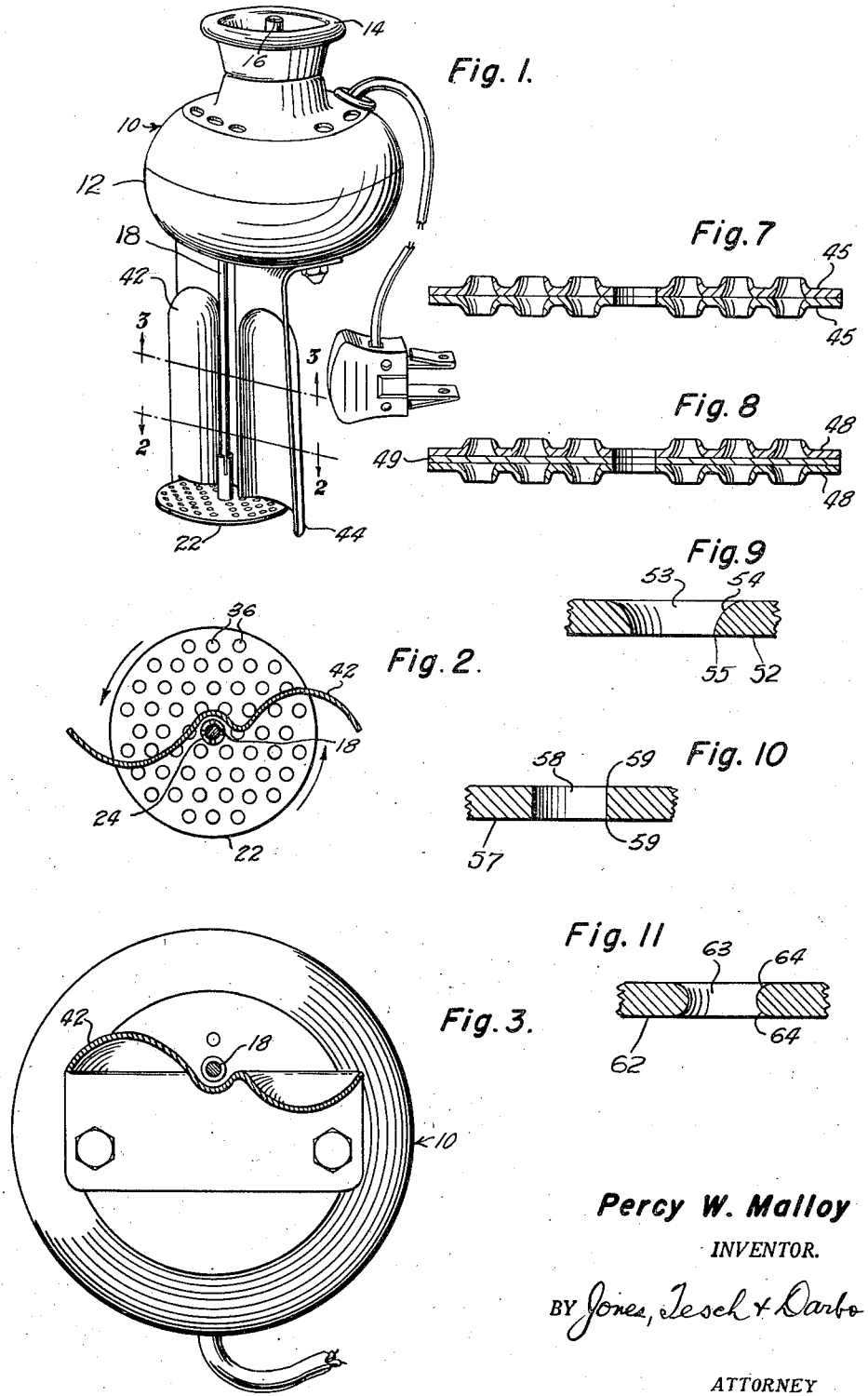

2,800,311
APPARATUS FOR WHIPPING CREAM AND THE LIKE

Percy W. Malloy, Madison, Wis., assignor of one-half to William M. Malloy, Dallas, Tex.

Application December 29, 1954, Serial No. 478,231

2 Claims. (Cl. 259—135)

This invention relates to apparatus for inducing a condition of froth in substances such as cream and the like by beating or agitating, that is, for whipping substances such as cream, eggs, and the like.

The principal object of the invention is to provide an apparatus which is highly effective for the purpose, whereby the whipping of cream to a stiff consistency is accomplished in a short period of time. Another object is to provide an apparatus which inhibits the propulsion effect upon the cream and the like, whereby spattering is substantially avoided. Another object is to provide an apparatus of the character described which is simple and economical. Other objects and advantages will be apparent from the following description.

In the drawings,

Fig. 1 is a perspective view of an embodiment of the apparatus of the invention;

Figs. 2 and 3 are, respectively, sectional views along lines 2—2 and 3—3 of Fig. 1;

Fig. 4 is a vertical sectional view of the apparatus;

Fig. 5 is a fragmental vertical sectional view on an enlarged scale showing the attachment of the impeller to the shaft of the motor;

Fig. 6 is a fragmental sectional view on an enlarged scale of the impeller of the embodiment of Figs. 1 to 5;

Figs. 7 and 8 are sectional views of different forms of impeller which are suitable of use with the apparatus of the invention;

Figs. 9, 10 and 11 are fragmental sectional views similar to Fig. 6 of different forms of impeller which are suitable for use with the apparatus of the invention, and Figs. 12 and 13 are perspective views of different forms of impeller which may be used with the apparatus of the invention;

The embodiment shown in Figs. 1 to 6 consists of an electrically operated motor 10 enclosed within the housing 12. Said housing has a cup-shaped part 14 attached to the top thereof, which part serves as a shield for the motor switch 16 and as a handle to facilitate the manipulation of the device. A shaft 18 is driven in rotation by the motor 10 and projects downwardly through an opening in the housing 12.

An impeller 22 is mounted upon the lower end of shaft 18. Said impeller is in the shape of a flat disk. A hollow cylindrical chuck 24 is fastened at one end thereof to the center of the impeller 22 and extends upwardly therefrom perpendicularly to the plane of the impeller. The lower end portion of the chuck is of reduced diameter to form a downwardly facing shoulder 26. Said reduced portion passes through an opening in the impeller 22, and the material of the chuck is peened over outwardly to rigidly fix the impeller in position against the shoulder 26. The bore of the chuck 24 is reduced at the lower end portion thereof to provide an upwardly facing shoulder 30, and the upper end portion of the chuck has a plurality of radial slots 32 therein. The portion of the bore above shoulder 30 has a diameter slightly smaller than the outside diameter of the shaft 18, and the impeller-chuck assembly is mounted frictionally upon the end of shaft 18 by pushing the chuck into telescoping engagement with the shaft until the end of the shaft engages shoulder 30, as shown in Fig. 5. The impeller-chuck assembly is readily dismounted from shaft 18 for cleaning or other purposes by pulling it free of such shaft. The arrangement described provides a frictional mounting for the impeller whereby it is rotated by shaft 18 in the general plane of the impeller.

The impeller 22 is provided with a plurality of openings 36 therethrough, distributed throughout the area of said impeller. The material of the impeller 22 surrounding the openings 36 is displaced laterally of the general plane of the impeller to form depressions 37 on the upper side and protuberances 38 on the lower side of the impeller, said protuberances having smooth sharp edges 39. In practice, the openings 36, depressions 37 and protuberances 38 are formed by a punch and die which simultaneously forms the openings 36 and extrudes the metal to form the depressions 37 and protuberances 38. The end result of such construction is that, surrounding each opening 36, there is a depression 37 having a rounded or convex surface upon the upper side of the impeller 22, and a sharp-edged protuberance 38 upon the lower side of the impeller.

A generally sheet-form baffle member 42 is fastened to the under surface of housing 12 and extends downwardly in parallel adjacent relation to shaft 18 and generally diametrically with respect to impeller 22. As shown in Figs. 2 and 3, baffle member 42 is generally S-shaped in transverse section, with the mid-portion in adjacent relation to shaft 18 and the portion on either side of said mid-portion being of concavo-convex shape. The direction of rotation of the shaft 18 and impeller 22 is as indicated by the arrows in Fig. 2, and the baffle 42 is arranged so as to present the concave surfaces thereof to the approaching portion of the impeller, as indicated by said arrows. The mid-portion of the baffle member 42 stops short of the impeller 22, as is shown in Fig. 4, and the marginal portions have downward projections 44 which extend beyond the impeller.

In operation, the housing 12 or the handle 14 is grasped by the hand and the motor 10 is energized and the impeller 22 and at least a portion of the baffle 42 are immersed in the cream or other substance to be whipped. The action of the device is a very rapid and effective whipping of the cream into the stiff consistency usually desired, the operation usually being accomplished in a matter of seconds. For example, with a device having a .004 horsepower motor operating at a full load speed of 2300 R. P. M. and an impeller disk 1.75 inches in diameter having 54 openings .10 inch in diameter, a two ounce quantity of the conventional coffee cream, having a butterfat content of 18 percent to 20 percent and being at a temperature of about 35° F., is whipped to a stiff consistency in about 10 to 15 seconds. The reason for the high effectiveness of the device is not understood, but it is believed to be due, at least in part, to a peculiar agitating action induced by the impeller 22, which is believed to include a shearing action by the edges 39 and an impelling action by which the cream is drawn through the openings 36. The end result is an agitating action which is extremely effective in inducing the condition of froth which is characteristic of the phenomenon which is conventionally called whipping.

The rotary motion of the impeller 22 causes a rotary motion of the cream or the like, and the baffle 42 restrains or obstructs such motion of the cream. This restraining action of the baffle performs the important function of increasing the effectiveness of the whipping operation, and it also prevents the cream from being thrown from the container and from being spattered about in the vicinity of the operation. In the absence of baffle 42, the whipping effectiveness of impeller 22 is greatly reduced.

Variations may be made in the construction and arrangement which has been described. For example, the position of the impeller 22 may be reversed from that shown in Figs. 4 and 5, i. e., the depressions 37 may be on the lower instead of the upper side of the impeller and the protuberances 38 may project upwardly instead of downwardly.

As a further modification, illustrated in Fig. 7, the impeller is composed of two disks 45, each similar to disk 22, placed back-to-back, that is, with the protuberances of one disk on the side thereof remote from the other disk. In Fig. 7 the two disks 45 are shown as being of the same size and arranged with the openings of one disk coinciding with those of the other. The disks may be of different size and the openings of one disk may be out of alignment with those of the other disk.

As an additional modification, illustrated in Fig. 8, the impeller is composed of two disks 48, each similar to disk 22, placed back-to-back and having an imperforate disk 49 between them. The effectiveness of the impellers of Figs. 7 and 8 is very great, being greater than that of the impeller of the embodiment of Figs. 1 to 6.

As a further modification, the construction of the openings and the portions of the impeller adjacent to the openings may be modified from that of the impeller 22 of the embodiment of Figs. 1 to 6. In the embodiment illustrated in Fig. 9, the impeller 52 is similar to the impeller 22 with the difference that the protuberances 38 are absent. Such impeller has openings 53 and depressions 54 similar to the openings 36 and depressions 37 of the impeller 22. The edges 55 opposite depressions 54 are sharp or angular. The impeller 52 is quite effective for the purpose. The surfaces of the depressions 37 and 54 need not be convex as shown in Figs. 6 and 9, but may be flat or frusto-conical, and may also be concave.

As a further modification, the impeller may have plain openings, without protuberances and depressions, as illustrated in Fig. 10. The disk 57 has openings 58 therein which are formed by a punch and die which removes the material at the opening and does not shape the adjacent material to form depressions and protuberances. The openings 58 have angular edges 59. Such an impeller is somewhat less effective than the impeller 22 of the embodiment of Figs. 1 to 6.

As an additional modification, the impeller may be similar to that shown in Fig. 10 with rounded instead of angular edges at the openings. Such an impeller is shown in Fig. 11 and is composed of the disk 62 having openings 63 with the rounded edges 64. The impeller of Fig. 11 is less effective than that of Fig. 10.

As a further modification, the impeller may be in a form other than that of a disk. It should be in the general form of a flat plate. The periphery thereof does not need to be circular or continuous, and the impeller may be rectangular, polygonal or of fanciful shape if desired. By way of illustration and not of limitation, two forms of impeller are shown in Figs. 12 and 13 which are different from the disk-form of impeller which has been described in the foregoing. The impeller 68 of Fig. 12 has a plurality of lobes 69 extending generally radially outward from the mid-portion thereof, and the impeller 72 shown in Fig. 13 has a plurality of angular arms 73 projecting substantially radially outward from the mid-portion thereof. Said impellers 68 and 72, respectively, have openings 70 and 74 therein, similar to openings 36 of impeller 22.

While a few variations in the structure of the whipping apparatus for cream and the like have been described in the foregoing, these are by way of illustration and other variations within the spirit of the invention will occur to those skilled in the art.

Invention is claimed as follows:

1. In apparatus for whipping cream or the like embodying a vertical drive shaft and impeller member fixed to said shaft at its lower end to rotate in a horizontal plane, that improvement comprising a cross-sectionally S-shape baffle relatively fixedly mounted adjacent said shaft having a centrally vertically extending grooved portion disposed arcuately about said shaft spaced closely therefrom and having side portions of oppositely directed concavo-convex shape extending laterally from said grooved portion, said side portions terminating at their upper ends in concave portions that are concave in a vertical direction whereby to deflect the whipped substance downwardly.

2. The structure of claim 1 wherein the shaft depends from a motor carried in a symmetrical housing and the shaft is offset from the vertical axis of the housing, said baffle being suspended from said housing between the shaft and said vertical axis.

References Cited in the file of this patent

UNITED STATES PATENTS

| | | |
|---|---|---|
| 1,375,338 | Werner et al. | Apr. 19, 1921 |
| 1,460,125 | Coleman | June 26, 1923 |
| 1,467,205 | Steele | Sept. 4, 1923 |
| 1,718,111 | Carlson | June 18, 1929 |